(12) United States Patent
Zoldi et al.

(10) Patent No.: US 11,636,485 B2
(45) Date of Patent: Apr. 25, 2023

(54) EFFICIENT PARALLELIZED COMPUTATION OF GLOBAL BEHAVIOR PROFILES IN REAL-TIME TRANSACTION SCORING SYSTEMS

(71) Applicant: FAIR ISAAC CORPORATION, Roseville, MN (US)

(72) Inventors: Scott Michael Zoldi, San Diego, CA (US); Alexei Betin, San Diego, CA (US)

(73) Assignee: Fair Isaac Corporation, Roseville, MN (US)

(*) Notice: Subject to any disclaimer, the term of this patent is extended or adjusted under 35 U.S.C. 154(b) by 716 days.

(21) Appl. No.: 15/947,717

(22) Filed: Apr. 6, 2018

(65) Prior Publication Data
US 2019/0311366 A1   Oct. 10, 2019

(51) Int. Cl.
*G06Q 20/40* (2012.01)
*G06Q 20/38* (2012.01)

(52) U.S. Cl.
CPC ..... *G06Q 20/4016* (2013.01); *G06Q 20/3827* (2013.01); *G06Q 20/3829* (2013.01); *G06Q 20/4097* (2013.01)

(58) Field of Classification Search
CPC .......... G06Q 20/4016; G06Q 20/3827; G06Q 20/3829; G06Q 20/4097
USPC ....................................................... 705/75
See application file for complete search history.

(56) References Cited

U.S. PATENT DOCUMENTS

| | | |
|---|---|---|
| 8,041,597 B2 | 10/2011 | Li et al. |
| 8,090,648 B2 | 1/2012 | Zoldi et al. |
| 9,531,738 B2 | 12/2016 | Zoldi et al. |
| 9,773,227 B2 | 9/2017 | Zoldi et al. |
| 2004/0073534 A1* | 4/2004 | Robson .................. G16B 50/00 |

(Continued)

OTHER PUBLICATIONS

Tierney, Luke "A Space-Efficient Recursive Procedure for Estimating a Quantile of an Unknown Distribution" Siam J. Sci. Stat. Comput. vol. 4, No. 4, Dec. 1983. pp. 706-711.

*Primary Examiner* — Patrick Mcatee
*Assistant Examiner* — Zesheng Xiao
(74) *Attorney, Agent, or Firm* — Mintz, Levin, Cohn, Ferris, Glovsky and Popeo, P.C.; F. Jason Far-hadian, Esq.

(57) ABSTRACT

Parallelized computation by a real-time transaction scoring system that incorporates global behavior profiling of transacting entities includes dividing a global profile computing component of a transaction scoring model of a real-time behavioral analytics transaction scoring system into a plurality of global profile component instances. The transaction scoring model uses a plurality of global profile variables, each of the plurality of global profile component instances using its own global profile partition that contains the estimate of global profile variables and being configured for update by a dedicated thread of execution of the real-time transaction scoring system, each dedicated thread being configured for receiving and scoring a portion of input transactions. The method further includes partitioning, based on one or more transaction routing shuffling algorithms, the input transactions for receipt across the plurality of global profile component instances, and updating each of the plurality of global profile partitions by the corresponding global profile component running in the dedicated thread according to the scoring algorithm.

18 Claims, 4 Drawing Sheets

(56) References Cited

U.S. PATENT DOCUMENTS

| | | | |
|---|---|---|---|
| 2005/0034112 A1* | 2/2005 | Stanfill | G06F 8/45 717/149 |
| 2008/0010166 A1* | 1/2008 | Yang | G06Q 30/0246 705/307 |
| 2008/0301037 A1* | 12/2008 | Monk | G06Q 99/00 705/38 |
| 2011/0251869 A1* | 10/2011 | Shekhter | G06Q 30/0603 705/7.28 |
| 2015/0379072 A1* | 12/2015 | Dirac | G06N 20/00 707/693 |
| 2016/0171131 A1* | 6/2016 | Morales | G06F 30/20 703/7 |
| 2020/0089204 A1* | 3/2020 | Tang | H04L 41/142 |

* cited by examiner

EFFICIENT PARALLELIZED COMPUTATION OF GLOBAL BEHAVIOR PROFILES IN REAL-TIME TRANSACTION SCORING SYSTEMS

TECHNICAL FIELD

The subject matter described herein relates to computer-implemented, real-time transaction scoring system for rank-ordering transactions by probability of being associated with a suspicious activity of interest, such as financial crime or cybersecurity threat, and more specifically to a method of parallelized computation of behavior profiling over the global population or major subpopulations of transacting entities in such systems.

BACKGROUND

Predictive analytic models are often used in real-time transaction scoring applications for the purpose of detecting rare malicious activities such as financial fraud in payment processing systems or cybersecurity threats in computer networks. Such analytic models typically produce a score designed to rank-order transactions according to the probability of being associated with the malicious activity.

An essential component of such analytic models that allows for high throughput and low latency in-stream processing are transactional entity profiles. Transactional entity profiles are key value pairs used by the analytic model where the key designates a monitored entity and the value represents a set of recursive feature estimators derived from raw data to summarize the history of the entity in a computationally efficient and compact manner and usually designed to decay past information smoothly over events or physical timescales.

Profiling is usually done on multiple levels, including a primary individual entity level (such as a cardholder, a payer, or a computer user, etc.), a secondary entity level of participating in the transaction (such as a merchant, a payee, or a server, etc.), and a global profile level, in which a global profile can summarize prior behavior over a class of entities sharing common characteristics (business customers, power users, HTTP servers, etc.), or at the global population level.

A predictive input variable in a real-time transaction scoring model can be configured to compare the current transaction against historical behavior captured in various entity or global profiles, and therefore updating the profile state efficiently while processing the real-time stream of events is critical to such systems.

Scalability in a real-time transaction scoring system is typically achieved through parallelization across a large number of processes or threads such that multiple transactions are being processed simultaneously. This works extremely well when processing is completely stateless. In the case of a transactional profiling system, the only state that persists between different transactions is one that is captured in the profiles. Inevitably, one has to deal with a situation where multiple transactions being processed in parallel need to update the same profile record which leads to the need for synchronization and causes contention on the shared profile records which slows down processing.

For example, an approach that works particularly well for individual entity profiles is affinity routing where transactions associated with the same entity are always routed to the same processing thread in the order in which they are received which eliminates the need for synchronization. Often a hashing algorithm that works well for the particular set of entity keys, this approach results in an even distribution of workload across different threads of computation and therefore near-linear scalability.

However, the principal challenge arises around what is referred to as global profiles which, as indicated above, associate with large groups of entities and transactions distributed unevenly across processing nodes with many transactions trying to update the same set of profiles at the same time, resulting in high level of contention and severely limiting the system's ability to scale even by adding more threads of computation. For instance, in a typical distributed streaming application, the input transactions are processed by a pipeline of parallelized components that execute specific computing tasks, such as input parsers, entity profile calculators, score calculators etc. A component can be a processor, a processing instance executed on a computer, or the like. The input transactions are shuffled between entity profile instances based on a profile entity key hash (this is known as "affinity routing"). The transactions get reshuffled (and, optionally, resorted) before each step of the pipeline. Random shuffling works well when profiles are not shared between computing threads, however, the global profile processes cannot be easily parallelized resulting in more than one thread having contention for shared profiles.

As shown in FIG. 1, a typical parallelized implementation of a transaction scoring model uses global profiles. Despite the entity profiles being parallelized through affinity routing, a single instance of each global profile record exists, which creates a bottleneck preventing full parallelization.

Accordingly, what is needed is a method that allows these global profiles to be computed efficiently in a parallelized manner which enables scalability while maintaining the ability of such global profiles to accurately summarize history over all relevant events ("remain global"). Further, what is needed are systems and methods for parallelization of a global profile parallelized component.

SUMMARY

In one aspect, parallelized computation by a real-time transaction scoring system that incorporates global behavior profiling of transacting entities includes dividing a global profile computing component of a transaction scoring model of a real-time behavioral analytics transaction scoring system into a plurality of global profile component instances. The transaction scoring model uses a plurality of global profile variables, each of the plurality of global profile component instances using its own global profile partition that contains the estimate of global profile variables and being configured for update by a dedicated thread of execution of the real-time transaction scoring system, each dedicated thread being configured for receiving and scoring a portion of input transactions. The method further includes partitioning, based on one or more transaction routing shuffling algorithms, the input transactions for receipt across the plurality of global profile component instances, and updating each of the plurality of global profile partitions by the corresponding global profile component running in the dedicated thread according to the scoring algorithm In some implementations, the merging is triggered by applying different suitable criteria (depending on type of model/application), i.e. after a specified number of transactions is processed by the component instance since previous merge, after a specified period of time elapsed since a previous merge, or a random forcing function which further ensures that, statistically, the merges are not biased around partitions having different lengths of update periods.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to predictive scoring models designed specifically for financial fraud detection, marketing, or cybersecurity, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

This document presents a method and system that enables efficient parallelized computation of global transactional profiles without significant loss of model predictive performance, and which is applicable to a variety of global variable types and deployment environments.

Figure 1:
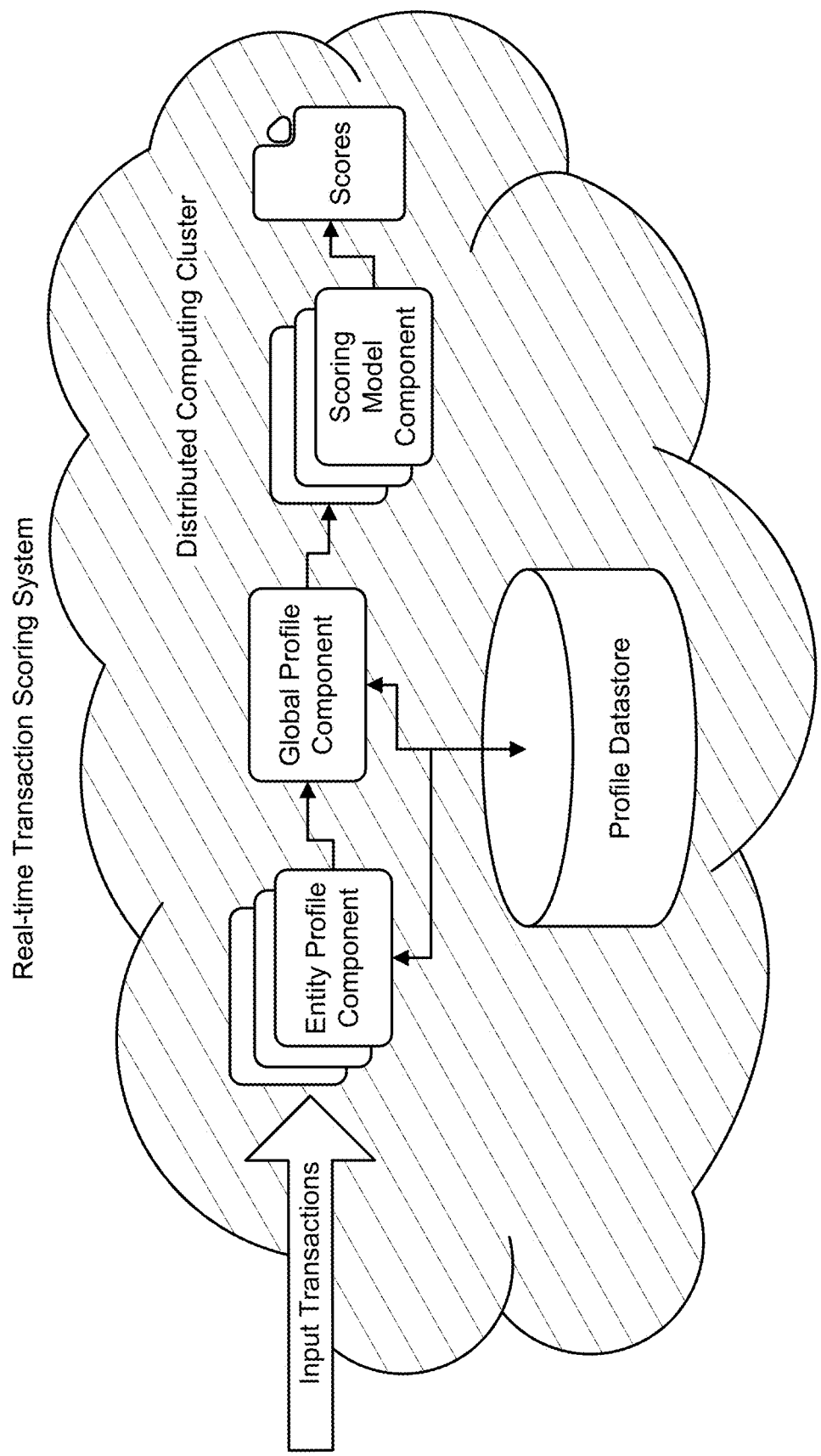
FIG. 1 shows a parallelized implementation of a transaction scoring model that uses global profiles.

Referring back to FIG. 1, a transactional profile is defined as a key-value pair where the key is the identifier for an entity or a group of entities, and the value is a tuple of recursively defined feature estimators derived from raw transaction data tuple x, such that $y_n = f(y_{n-1}, x_n)$. A global profile tracks behavior across multiple entities and over the entire population (sometimes subdivided into major subpopulations, or "peer groups") and therefore needs to track or sense all the transactions in the stream in order to update its variables correctly.

A transaction processing system can have multiple entity profile and global profile parallelized components. There can be different types of global profile variables used in transaction scoring models. For example, an event-decayed average or a time-decayed velocity variable can be used to track global behavior patterns across subpopulations. In unsupervised outlier models, a quantile estimation algorithm can be used to estimate a distribution of a random variable (such as transaction amount or the number of packets transmitted over a network connection). Another type of global profile is often referred to as Global Intelligent Profiles that utilize a global behavior sorted list that is used to track the top actors (such as most-frequently-used ATMs or most popular web-servers) with respect to the entire population or a class of entities.

Figure 4:
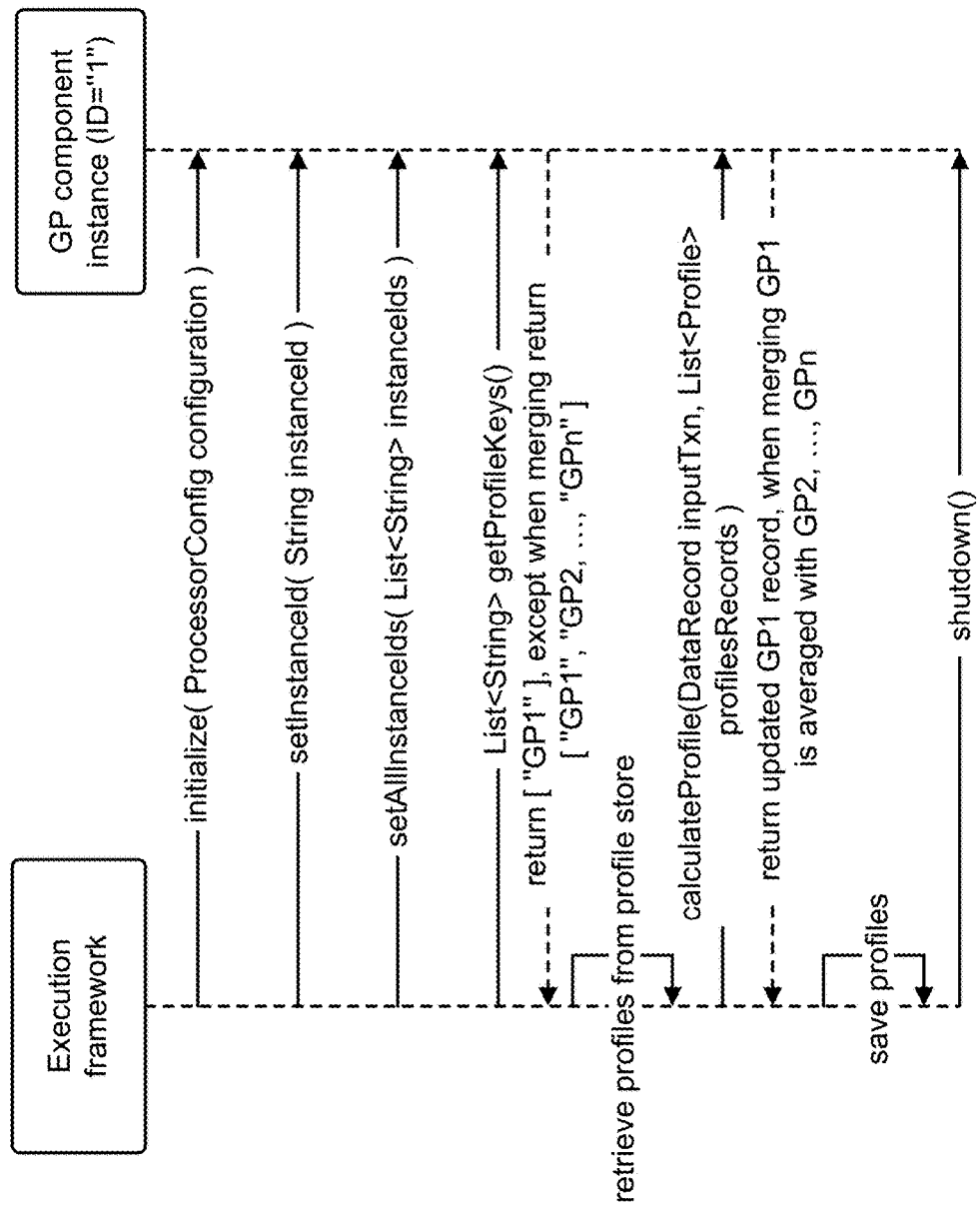
FIG. 4 depicts the API and the typical lifecycle of a global profile parallelized component inside the streaming execution framework; and When practical, similar reference numbers denote similar structures, features, or elements.

During model development one must establish that models variables remain robust/stable to the necessary adjustment needed to compensate for the effect of parallelization across component instances. A specific software implementation is provided and global component API and lifecycle are defined as depicted in FIG. 4, and as described below.

The disclosed method can be summarized as follows:
  divide a single global profile into several global profile partitions each of which is updated by a single dedicated thread of execution that only receives a fraction of transactions (this removes the single point of contention);
  use random shuffling of input transactions across global profile partitions to remove any bias and minimize divergence between individual estimates or,
  alternately in transactional system, it is possible (and sometimes desired) that partitioning is done not using random transaction level shuffling but rather done at an entity level such that all transactions for the same entity (e.g. account) are routed to the same global partition; this is often referred to as affinity routing and is done by using a hash function on the entity primary identifier (entity profile key);
  adjust individual recursive estimates as necessary to compensate for the fact that fewer transactions are seen by an individual thread during parallelized execution as compared to single thread execution;
  periodically merge, in an asynchronous manner, the global profile partitions and the variables therein, using a suitable variable-specific merge formulae based on a weighted average The system and method disclosed herein adds to the model execution runtime a function to retrieve/store profiles so it can be implemented in any existing parallelized runtime environment which provides profile access functionality. The methods disclosed herein, however, do not require any global locking or synchronization across global profiles partitions, either at the time of profile updates, of at the type of partition merges.

Per the disclosed method, each of the threads associated with a global profile partition updates "its own" profile record only, so there is no need to maintain a "master" record or partition (as per the concept of Master and Slave schemes), and access to any other global profile partition is "read only." This is essential to runtime performance—such that a merge event does not cause a "stop the world" type of synchronization across partitions, and which therefore also does not inhibit parallelization in any way.

The merge interval can be specified as a number of transactions monitored by the given partition, or based on a period of time elapsed since a previous merge—the number of transactions since last merge or the time elapsed since last merge represents the only additional data items updated in each global profile partition, as compared to a single threaded solution. This merge interval can also be a random forcing function which further ensures that, statistically, the merges are not biased around partitions having different lengths of update periods. When a merge is triggered based on the specific condition, the merging global profile partition thread reads all other global partition records (read only) and updates its own state (set of variables) using a set of formulas that can be tuned to the specific variable and problem type.

Figure 2:
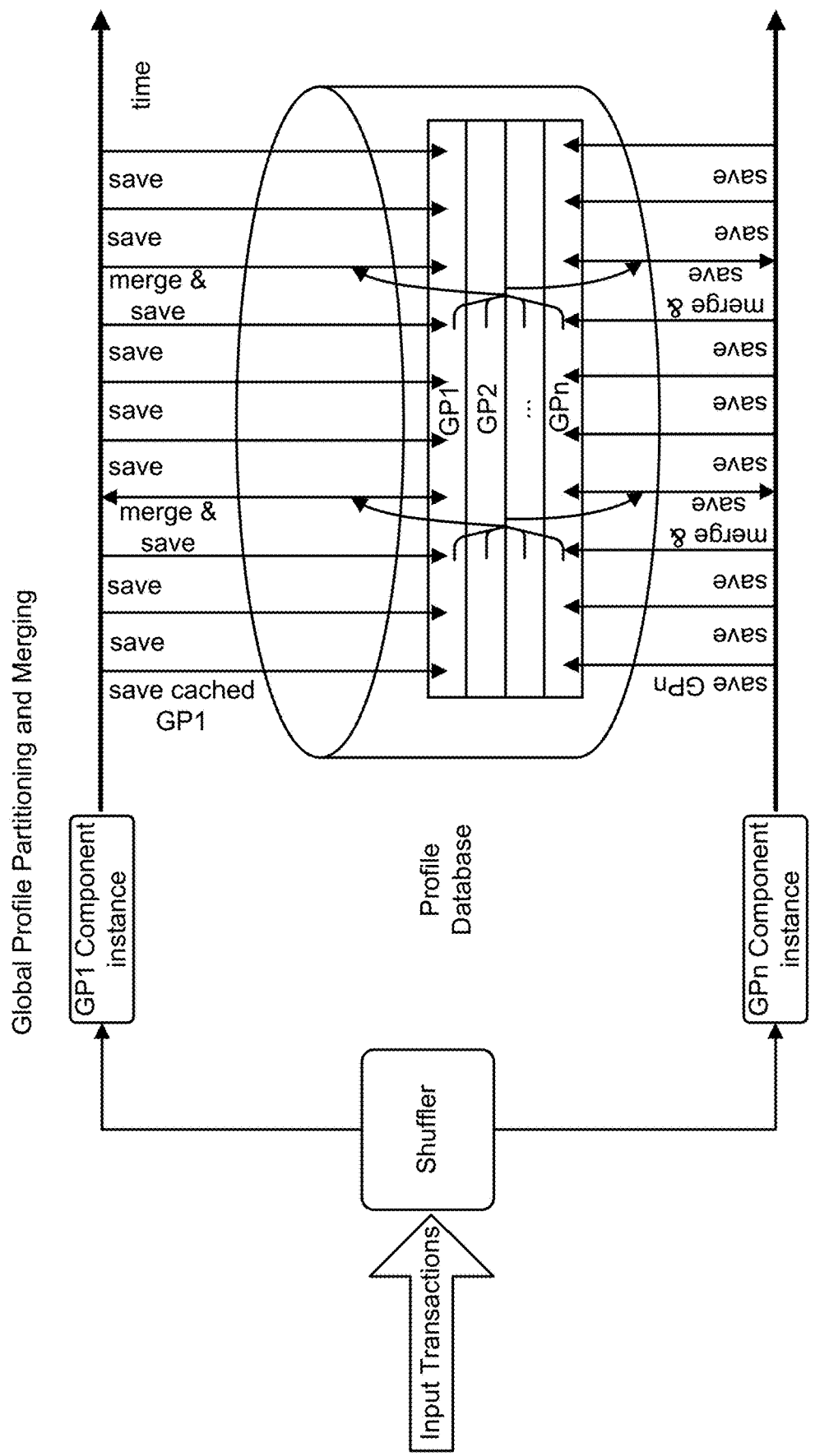
FIG. 2 illustrates partitioning and merging for global profiles.

A method of partitioning and merging is illustrated on FIG. 2, which illustrates the proposed partitioning and merging for global profiles. Transactions are shuffled between multiple Global Profile component instances. Each of these instances maintains its own GP partition (denoted as GPn). Each partition constitutes a profile database record that is, in a typical implementation, cached locally in memory of the node that executes the component instance and is periodically persisted (saved to the datastore) by the component instance. When a merge is triggered for a given component instance, the component instance reads all existing GP partitions, merges their estimates with its own, and saves the updated copy in its own partition.

As discussed above, the merge interval can be randomized, such as following e.g. a Gaussian distribution around the specified expected time value, so as to avoid multiple merges happening at the same time. While it may be essential for balancing certain global estimates to ensure that each global partition sees the same number or transactions—which is easy to achieve using random shuffling, or else the merging formulae may need to be adjusted to account for the number of observations seen by each global partition thread—the individual global partition merges need not happen at the same time nor be synchronized in any way.

If the number of global profile partitions becomes so large that the number of partition reads required for merging becomes a performance concern, then the number of reads can be bounded by either creating a hierarchy of partitions or by having each global profile partition merge with a fixed bounded number of randomly selected partition peers.

Because of partitioning, the global estimates are "spread" across partitions and there is no "master" partition or state. In practice, this is not a limitation, as for use cases that require a notion of the "current global state" of the profile variables (e.g. migration or failover), the global profile partition is used with the latest merge timestamp as the "current global state" at any given moment of time given that it was the one that was last synchronized out of the set of partitions.

The efficacy of the proposed method can be measured as its ability to closely approximate the non-parallelized computation such that the transactional model predictive performance is not significantly impacted. This efficacy depends on the merge formulae being devised for a specific type of global variable so as to enable parallelized approximation. Nevertheless, the method as disclosed herein works for a large variety of types of global profile variables, and while the exact merge formulae depend on the type of global variable (statistic) being computed and adjacent problem-specific considerations, there are general guidelines and considerations that apply to different global variables typically used in transactional models.

In all cases, a suitable type of weighted average of individual global profile partitions values is used to compute the new merged value of the estimate. For example, a simple average can be often used in a situation where random transaction shuffling guarantees an unbiased split of the overall transaction population and the number of transactions seen is equal across the partitions:

$$\xi k = \frac{\sum_{i=1}^{m} \xi i}{m},$$

where $\xi$ is the quantity being merged, i is the partition index, m is the number of partitions and k is the index of the partition being merged.

The simple average approach may result in undesirable overweighting of the partitions that happen to perform their merge last. This can be addressed by an adjusted weighted average formula which takes into account the recency of merges by each partition:

$$\xi k = \left(e^{-\frac{\Delta t}{T}}\right)\xi l + \frac{\left(1 - e^{-\frac{\Delta t}{T}}\right)}{m}\sum_{i=1}^{m}\xi i$$

where l is the index of the partition that performed the most recent previous merge, $\Delta t$ is the time elapsed since the most recent merge, and T is a suitable time decay constant.

Note that with this approach, if the previous merge has just happened ($\Delta t \approx 0$), then the result is very close to the value of the $l^{th}$ partition as it already contains an accurate merged global estimate. Whereas for the 1st merge ever ($\Delta t = \infty$) or whenever $\Delta t \gg T$ the formula approaches the simple average of all m partitions $\xi i$.

Note further that the total weight of $\xi l$ in the summation above comes from both its contribution as being the last partition and its contribution as being one of the partitions and is equal to $$\frac{(m-1)}{m}e^{-\frac{\Delta t}{T}} + \frac{1}{m}$$

converging along with the weights of all other partitions to $$\frac{1}{m}$$

for $\Delta t \gg T$.

For some types of variables, it may be best to weigh last merge recency in terms of a number of transaction events seen, rather than physical time. In that situation, the formula above can be revised in terms of number of events:

$$\xi k = \left(e^{-\frac{\Delta n}{N}}\right)\xi l + \frac{\left(1 - e^{-\frac{\Delta n}{N}}\right)}{m}\sum_{i=1}^{m}\xi i$$

where Δn is the total number of transaction events seen (by each thread, including thread k) since the most recent merge (done by thread l), and N is the decay constant. If a variable is computed by an algorithm that updates the value only after processing a set of observations, called an "epoch," then n in the above formula may be taken to represent the number of epochs rather than the number of observations.

Note that if affinity shuffling, rather than random shuffling, is used, then different global partitions will not typically receive the same number of transactions. Sometimes when routing is done to separate major subpopulations with inherently different distributions, no merging between such partitions is necessary or desired. When merging the individual partition estimates is required, one has to consider if the estimates should be weighted based on the number of transactions (as opposed to e.g. the number of entities) seen by each global partition. The desired effect can be achieved by applying the additional weights to the merge formulae as follows:

$$\xi k = \frac{\left(e^{-\frac{\Delta n_l}{N}}\right)\Delta n_l \xi l + \frac{\left(1-e^{-\frac{\Delta n_l}{N}}\right)}{m}\sum_{i=1}^{m}\Delta n_i\,\xi_i}{\left(e^{-\frac{\Delta n_l}{N}}\right)\Delta n_l + \frac{\left(1-e^{-\frac{\Delta n_l}{N}}\right)}{m}\sum_{i=1}^{m}\Delta n_i}$$

or, in case of time-weighted averaging, $$\xi k = \frac{\left(e^{-\frac{\Delta t}{T}}\right)\Delta n_l \xi l + \frac{\left(1-e^{-\frac{\Delta t}{T}}\right)}{m}\sum_{i=1}^{m}\Delta n_i\,\xi_i}{\left(e^{-\frac{\Delta t}{T}}\right)\Delta n_l + \frac{\left(1-e^{-\frac{\Delta t}{T}}\right)}{m}\sum_{i=1}^{m}\Delta n_i}$$

where $\Delta n_i$ is the number of new observations since last merge seen by partition i.

In some implementations, the merging is a function of number of events since last merge. In alternative implementations, the merging is a function of time elapsed since last merge, or further still may be a random function ensuring non-biased priority of updates.

As stated above, an adjustment to each individual thread's estimate of a global quantity may be necessary to account for the fact that the number of observations seen by each partition is a fraction of the total number of observations that would be seen by a single non-parallelized computation thread. This is both because population statistics other than simple averages are estimated, and because statistics for the distributions that shift over physical time and/or the event window are estimated.

In accordance with some implementations, assume a collection of m parallelized compute partitions. After seeing N total observations (transactions), the estimate in each partition in the collection is designed to converge to the same estimate that would have been obtained by a single non-parallelized partition after seeing those same N transactions. To achieve that, the proposed method is to effectively "pretend" or be configured to calculate as if each partition has seen the whole of N observations whenever it has, in fact, seen only N/m observations. Specifically, in case of event or time decayed averages, this would ensure that a parallelized partition adjusts its estimate at the same rate as the single-threaded estimator would.

Consider first the case of computing an exponential moving average of quantity x over a series of observations. Such a moving average is recursively defined as $y_n=(1-\alpha)y_{n-1}+\alpha x_n$. In the case of parallelized computation this formulation is adjusted as if the value of x has been observed m times leading to $y_n=(1-\alpha)^m y_{n-1}+(\Sigma_{i=0}^{m-1}(1-\alpha)^i)\alpha x_n = (1-\alpha)^m y_{n-1}+(1-(1-\alpha)^m)x_n$ where m is the number of partitions and a is the decay factor used in non-parallelized case. Often $y_n$ can be approximated simply as $y_n=(1-m\alpha)y_{n-1}+m\alpha x_n$ for sufficiently small $\alpha$ and m.

An alternative formulation of the same type of variable is $y_n=y_{n-1}+\alpha(x_n-y_{n-1})=y_{n-1}+\alpha\varepsilon_n$ where $\varepsilon_n=x_n-y_{n-1}$ is the difference between the current and the previous estimate (the error). Adjusting for the parallelized computation case, same as above, we pretend that the error $\varepsilon_n$ is observed m times, and the recursive update formulae in each individual thread takes the form: $y_n=y_{n-1}+(\Sigma_{i=1}^{m}(-1)^{i-1}(\alpha)^i)\varepsilon_n=y_{n-1}+(1-(1-\alpha)^m)\varepsilon_n\approx y_{n-1}+m\alpha\varepsilon_n$.

The decay factor $\alpha$ can be expressed in terms of a constant integer N that represents the number of events such all events prior to N most recent ones contribute only $$\frac{1}{e}$$

of the total estimate:

$$\alpha = 1 - e^{-\frac{1}{N}}.$$

A global event average variable is then recursively defined as $$y_n = \left(e^{-\frac{1}{N}}\right)y_{n-1} + \left(1 - e^{-\frac{1}{N}}\right)x_n,$$

such an event average profile variable can be used to estimate a global population average of a quantity x and used in deriving powerful predictor variables. To adjust such an estimate update in case of m parallelized partitions, we simply use $$y_n = e^{-\frac{m}{N}}y_{n-1} + \left(1 - e^{-\frac{m}{N}}\right)x_n$$

whenever a new value $x_n$ is observed in a given thread.

Note that no such adjustment of individual partition estimates is necessary when estimating an exponential moving average and the decay window is defined in terms of physical time based on transaction timestamps. For example, consider a variable which estimates a time decayed exponential moving average defined as where $$y_n = \left(e^{-\frac{\Delta t_n}{T}}\right)y_{n-1} + \left(1 - e^{-\frac{\Delta t_n}{T}}\right)x_n$$

$\Delta t_n = t_n - t_{n-1}$ is the time delta between the current and the previous transaction. Whenever a new quantity $x_n$ is observed in a given partition, it can be assumed the same quantity is observed m times and all m observations happen at the same exact time such that $\Delta t_n = 0$ for all but one observation and hence no further adjustment to the recursive estimate is necessary in the above case or, more generally, whenever we have $y_n=(1-\alpha(\Delta t_n))y_{n-1}+\alpha(\Delta t_n)x_n$ such that $\alpha(0)=0$.

An adjustment is necessary, however, with a time decayed variable that estimates a statistic that is a sum or a velocity (e.g. daily rate) of the observed quantity x. Consider a global estimate of the average time decayed velocity of quantity x approximated (for n's such that the "profile age" $t_n-t_0 \gg T$) as $$y_n = \left(e^{-\frac{\Delta t_n}{T}}\right)y_{n-1} + \frac{x_n}{T}$$

where T is the decay period. In a parallelized computation, in order for each individual partition estimate to converge to the same global estimate a single threaded computation, the same assumption can be made of having observed $x_n$ m times at the same moment $t_n$ and therefore adjust the recursive estimate simply by replacing $x_n$ with $mx_n$:

$$y_n = \left(e^{-\frac{\Delta t_n}{T}}\right)y_{n-1} + \frac{mx_n}{T}.$$

Note that the adjusted estimate $y_n$ (m), while being suitable for use in the recursive update formulae for purposes of tracking a shift in distribution of y in a parallelized computation, is suitable as a substitute for the value of $y_n$ to be used in computing derived model variables that depend on $y_n$ only to the extent that the shift in distribution of y over any m observations is expected to be sufficiently small. Whether this condition is satisfied can be established during model training. The model has to be tested specifically with respect to how it performs in a parallelized execution environment and one may be required to construct model variables or adjust variable definitions such that they stay robust to the necessary upweighting due to parallelization. However, in practice, this requirement proves to be not very restrictive—due to the "global" nature of the variables in question as they correspond to statistics that describe the entire population or a set of large subpopulations.

Another possible alternative is to use a mini-batch (epoch) based approach to updating global variables during training to ensure a model's performance stability with respect to the variation associated with parallelized computation of variables in production.

The proposed method has been successfully applied to parallelizing computation of recursive quantile estimates. Efficient in-stream computation of quantile estimates is critical to real-time self-calibrating outlier anomaly detection models used in fraud detection and cybersecurity.

A preferred exemplary implementation of online quantile estimation is an adaptation of a method used to estimate the quantile for the entire population, and which applies stochastic updates to the running quantile estimates upon seeing each new observation, the method described herein introduces a decay factor 1/N so as to capture sufficiently recent behavior and achieves the desired stability of estimates by computing the error of the current estimate over an epoch of observations and updating the quantile estimate at the end of the epoch using this formulae (similar to formulae described above):

$$\xi_n = \xi_{n-1} - \frac{1}{N}\frac{Z(\xi_{n-1})-\alpha}{f_n(\xi_{n-1})}$$

where a is the CDF value of the quantile to be estimated (e.g. 0.95), $\xi$ is the estimated quantile (the value of x at a point where CDF(x)=$\alpha$), N is an integer decay constant (the number of epochs over which to decay the impact of old observations), n is the epoch's index (the equation above is used for matured estimate updates where n≥N), $f_n$ is an estimate of probability density of x at x=$\xi_{n-1}$, and Z is the fraction of observations of x in the current epoch such that the observed value $x_i$ is less than the previous quartile estimate $$\xi_{n-1}: Z(\xi) = \frac{1}{k}\sum_{i=1}^{k} \mathbb{1}(\xi-x_i),$$

where k is the number of observations in the epoch (the epoch size), $x_i$ is the observed quantity, and $\mathbb{1}(\xi-x_i)$ is the Heaviside unit step function. Note that the expression $(Z(\xi_{n-1})-\alpha)$ represents the "error" (in terms of CDF) of the previous estimate $\xi_{n-1}$ relative to the current epoch.

In turn, the new estimate of the probability density $f_n$ (the "learning rate") is computed as a weighted average of the previous estimate $f_{n-1}$ with the density (fraction) of observations in the vicinity $\pm\delta_{n-1}$ of the previous quantile estimate $\xi_{n-1}$ computed directly from the $n^{th}$ epoch sample:

$$f_n = \frac{N-1}{N}f_{n-1} + \frac{1}{N}\frac{\sum_{i=1}^{k}\mathbb{1}(\delta_{n-1}-|x_i-\xi_{n-1}|)}{2\delta_{n-1}k}$$

where N is the decay constant, and k is the number of observations in the epoch.

To apply the merge formulae proposed above to the problem of online quantile estimation described above, several adjustments need to be made. First, $\Delta$n needs to be understood as the number of epochs seen since the most recent merge. Further, as explained earlier, the estimates need to update faster in presence of m parallelized partitions so that the rate of adjusting the global quantile estimate over the same transaction window matches the non-parallelized execution case.

The adjustment can be applied directly to the moving average formulations for $f_n$ and $\xi_n$ using the formula described above, and substituting $$\alpha =$$

$$\frac{1}{N}: f_n = \left(\frac{N-1}{N}\right)^m f_{n-1} + \left(1-\left(\frac{N-1}{N}\right)^m\right)\frac{\sum_{i=1}^{k}\mathbb{1}(\delta_{n-1}-|x_i-\xi_{n-1}|)}{2\delta_{n-1}k} \text{ and}$$

$$\xi_n = \xi_{n-1} - \left(1-\left(\frac{N-1}{N}\right)^m\right)\frac{Z(\xi_{n-1})-\alpha}{f_n} \text{ or,}$$

as noted $$f_n = \left(1-\frac{m}{N}\right)f_{n-1} + \frac{m}{N}*\frac{\sum_{i=1}^{k}\mathbb{1}(\delta_{n-1}-|x_i-\xi_{n-1}|)}{2\delta_{n-1}k} \text{ and}$$

$$\xi_n = \xi_{n-1} - \frac{m}{N} \frac{Z(\xi_{n-1}) - \alpha}{f_n}$$

before, it is often appropriate (when m<<N) to use the approximations respectively.

As discussed above, it is essential and needs to be demonstrated during model training that the quantile estimates (and any derived quantities such as scaled values of x used as model predictors) are robust with respect to the proposed upweighting. This is usually the case for global profiles where the statistics are computed over large volumes of observations and the underlying distribution does not shift significantly over the course of m epochs. When this is not the case, adjustments can be made to the values of $\xi_n$ used in the model (as opposed to the value used for the purposes of estimate update) to mitigate the effect. Note also that for simplicity, it is assumed (and recommended) that parallelized computation of global quantiles is not used during the global profile maturation period (n<N).

Yet another type of profile used in transactional models is a Global Intelligent Profile which is, effectively, a Behavior Sorted List defined as a bounded (usually by size) list of entries ordered by decayed frequency weights. An example of a Behavioral Sorted List is described in U.S. Pat. No. 9,773,227, by Fair Isaac Corporation of Roseville Minn., and the contents of which are hereby incorporated by reference for all purposes. The weight associated with each $i^{th}$ entry is updated with each new observation as follows: $w_{(n)i} = \beta w_{(n-1)i} + \sigma_{ik}$ where $\beta < 1$ is a constant, k is the index of the list item that occurs in the current transaction and $\sigma_{ik}$ is the Cronecker delta. This also means that if the entry is not on already on the list, it gets added to the list with $w_i = 1$ which upon maturity results in eviction of an existing entry with the lowest weight from the list.

This formulation can be more complicated using e.g. the value of a transaction or time of day into the weight update formula, and additional eviction criteria may be used. Note also that each entry of the global list may contain a payload of recursive profile variables associated with the given item, those variables are used in the scoring model but not used in the calculation of weight or rank of the entry on the list.

If such a list is computed in a parallelized fashion by m parallelized threads, the partitioning of the list (and random shuffling of the transactions) makes it impossible to match the single threaded weights or rankings exactly. An upweighting adjustment to the weights, as described herein, can be done to compensate for parallelization: in case of m parallelized threads the iterative weight update takes the form of $$w_{(n)i} = \beta^m w_{(n-1)i} + \sigma_{ik} \frac{1 - \beta^m}{1 - \beta}.$$

Such adjustment results in weights that follow the single partition "ground truth" scenario more closely upon merging and may result in better preservation of the overall ranking across multiple partitions (as compared to experiments with no such adjustment), provided the list size is large enough that the set of top entries on the list remains stable even when partitioned.

However, with respect to individual partitions, this approach results in more volatility, since the upweighting adjustment described herein bumps up the ranking of new entries and makes it generally harder for the old entries to "survive" on the list, hence careful testing of parallelization approach during model training on a specific dataset is necessary. In practice, given the "global" nature of the Behavior Sorted List, this consideration is rarely a problem, and the weights can be updated with or without the additional upweighting as long as the various Behavior Sorted List parameters (the value of β, the maximum list size, and the eviction criteria) are carefully chosen and tested for the anticipated parallelization scenarios.

The merge of individual partitioned Behavior Lists into one can be done by applying an appropriate weighted average to all the frequency weights, reordering the combined list according to the updated weights, and then pruning the list to ensure it remains bounded according to any specified original constraints such as maximum size. The adjustment of payload variables, if any, is dependent on the specifics of each variable and can be done following the same general principles and according to the same averaging formulae with appropriate unweighting applied if necessary as described above. The merging of Global Behavior List partitions is illustrated on FIG. 3.

Figure 3:
FIG. 3 illustrates the merging of two behavior list partitions.

FIG. 3 illustrates the merging of two behavior list partitions. The single partition table illustrates the "ground truth" which is the list produced when all transactions are processed and the list is computed by a single execution thread. The merging is done by simple averaging of weights followed by reordering and pruning, and without any additional upweighting adjustment.

The software implementation of the proposed method within a streaming transaction scoring system includes prepending of an instance ID to each global profile key and making the list of instance ID's available in the model API, as well as the implementation of a suitable merge method for every global variable class and taking care of merge interval conditions, adjustments to decay constants, and any edge case scenarios. Otherwise, no changes are necessary to the model's software implementation or variable definitions.

FIG. 4 depicts the API and the typical lifecycle of a global profile parallelized component inside the Streaming Execution Framework (an example of such framework is Apache Storm, but the implementation is possible for any parallelized streaming framework). The framework assigns an instance ID to the component instance (a "bolt" in Apache Storm terminology) upon the instance creation, it then initializes the component instance with the list of all available instance IDs (including its own). Then for every transaction the framework calls getProfileKeys( ) method on the component instances, retrieves the requested profile records from a data store, calls calculate( ) method on the component instance to actually compute the profile variables, and saves the new profile state into the profile database. The shutdown( ) method is called once upon the system shutdown.

The global profile key is implemented as a string concatenation of a common prefix with the instance ID (e.g. "GP"+"1"="GP1"). The getProfileKeys( ) method then is implemented such that it returns the single key associated with the current instance at all times except when Global Profile merge is triggered by an appropriate condition, and in those case it returns the list of all Global Profile keys resulting in the execution framework fetching and passing all existing global profile records to the global profile component instance.

The calculateProfile( ) method is called to process the current transaction and update the global profile partition associated with the current component instance. When a merge is triggered, the method receives a list of all Global Profile records and updates its partition by applying an appropriate merge algorithm as described in the examples above. No synchronization between different Global Profile processor instances is necessary since each of them only updates its own Global Profile partition.

Note that there could be a higher processing latency associated with the transaction that triggers the global profile merge. When this is an issue, it is possible to alter the implementation to score the transaction synchronously while invoking the merge asynchronously on the component instance.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method of parallelized processing of data by a real-time transaction scoring system to reduce level of contention associated with parallel processing of a plurality of behavior profiles for transacting entities, the method comprising:

dividing a global profile computing component of a transaction scoring model of a real-time transaction scoring system into a plurality of global profile component instances, the transaction scoring model using a plurality of global profile variables, one or more of the plurality of global profile component instances using at least one of a plurality of global profile partitions that contains the estimate of global profile variables and being configured for update by a dedicated thread of execution of the real-time transaction scoring system, the dedicated thread of execution being configured for receiving and scoring a portion of input transactions;

partitioning, based on one or more transaction routing shuffling algorithms, the input transactions for receipt across the plurality of global profile component instances;

updating one or more of the plurality of global profile partitions by the corresponding global profile component instances running in the dedicated thread according to the scoring algorithm; and merging the plurality of global profile partitions and individual estimates of global profile variables, without applying a global lock across the plurality of global profile partitions, based on an upweighting of observations in the plurality of global profile partitions by at least one of the plurality of global profile component instances, the upweighting comprising adjusting weights associated with one or more observations by increasing the weight of an observation according to at least one of a number of events observed since a previously performed merge, and an amount of time elapsed since the previously performed merge.

2. The method in accordance with claim 1, wherein the partitioning is performed according to a random transaction-level shuffling applied to the input transactions across the plurality of global profile partitions to remove bias and minimize divergence across the plurality of global partitions.

3. The method in accordance with claim 1, wherein the partitioning is performed according to an entity-level shuffling of the input transactions based on the transaction entities.

4. The method in accordance with claim 3, wherein the entity-level shuffling of the input transactions is performed using a hash function on a primary identifier of at least one of the transaction entities.

5. The method in accordance with claim 1, wherein the merging is performed using a variable-specific merge formula.

6. The method in accordance with claim 5, wherein the merging of the plurality of global profile partitions is triggered independently from other component instances without a global locking or synchronization.

7. The method in accordance with claim 6, wherein the plurality of global profile component instances are equal in terms of update and merge priority.

8. The method in accordance with claim 5, wherein the merging is triggered by applying different suitable criteria.

9. The method in accordance with claim 5, wherein the global profile variables include global profile variable types of one or more of an event rate, daily rate, quantile estimators, and/or behavior sorted lists.

10. A system comprising a computer program product that includes a non-transitory machine-readable medium storing instructions that, when executed by at least one programmable processor, cause the at least one programmable processor to perform operations comprising:

dividing a global profile computing component of a transaction scoring model of a real-time behavioral analytics transaction scoring system into a plurality of global profile component instances, the transaction scoring model using a plurality of global profile variables, at least one of the plurality of global profile component instances using its own global profile partition that contains the estimate of global profile variables and being configured for update by a dedicated thread of execution, at least one dedicated thread being configured for receiving and scoring a portion of input transactions;

partitioning the input transactions for receipt across the plurality of global profile component instances; and updating at least one of the plurality of global profile partitions by a corresponding global profile component instance running in the dedicated thread according to the scoring algorithm;

merging the plurality of global profile partitions and individual estimates of global profile variables, without applying a global lock across the plurality of global profile partitions, based on an upweighting of observations in the plurality of global profile partitions by at least one of the plurality of global profile component instances, the upweighting comprising adjusting weights associated with one or more observations by increasing the weight of an observation according to at least one of a number of events observed since a previously performed merge, and an amount of time elapsed since the previously performed merge.

11. The system in accordance with claim 10, wherein the partitioning is performed according to a random transaction-level shuffling of the input transactions.

12. The system in accordance with claim 10, wherein the partitioning is performed according to an entity-level shuffling of the input transactions based on the transaction entities.

13. The system in accordance with claim 12, wherein the entity-level shuffling of the input transactions is performed using a hash function on a primary identifier of at least one of the transaction entities.

14. The system in accordance with claim 10, further comprising: merging, using a variable-specific merge formula, the plurality of global profile partitions and individual estimates of global profile variables associated therewith.

15. The system in accordance with claim 14, where the merging of the plurality of global profile partitions is triggered independently from other component instances without a global locking or synchronization.

16. The system in accordance with claim 15, wherein the plurality of global profile component instances are equal in terms of update and merge priority.

17. The system in accordance with claim 10, wherein the merging is triggered by applying different suitable criteria.

18. A computer-implemented system for parallelized processing of data by a real-time transaction scoring system to reduce level of contention associated with parallel processing of a plurality of behavior profiles for transacting entities, the system comprising one or more processors configured for: dividing a global profile computing component of a transaction scoring model of a real-time transaction scoring system into a plurality of global profile component instances, the transaction scoring model using a plurality of global profile variables, one or more of the plurality of global profile component instances using at least one of a plurality of global profile partitions that contains the estimate of global profile variables and being configured for update by a dedicated thread of execution of the real-time transaction scoring system, the dedicated thread of execution being configured for receiving and scoring a portion of input transactions; partitioning, based on one or more transaction routing shuffling algorithms, the input transactions for receipt across the plurality of global profile component instances; updating one or more of the plurality of global profile partitions by the corresponding global profile component instances running in the dedicated thread according to the scoring algorithm, the updating being triggered independently from other component instances without a global locking or synchronization, and merging the plurality of global profile partitions and individual estimates of global profile variables, without applying a global lock across the plurality of global profile partitions, based on an upweighting of observations in the plurality of global profile partitions by at least one of the plurality of global profile component instances, the upweighting comprising adjusting weights associated with one or more observations by increasing the weight of an observation according to at least one of a number of events observed since a previously performed merge, and an amount of time elapsed since the previously performed merge, the merging triggered by applying different suitable criteria, and the global profile variables including global profile variable types of one or more of an event rate, daily rate, quantile estimators, and/or behavior sorted lists.

* * * * *